United States Patent
Vig et al.

(10) Patent No.: US 12,452,208 B2
(45) Date of Patent: Oct. 21, 2025

(54) PING INTERVAL SYSTEM

(71) Applicant: GM Global Technology Operations LLC, Detroit, MI (US)

(72) Inventors: Sandeep Vig, Oakland Township, MI (US); Scott Thomas Droste, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 18/405,605

(22) Filed: Jan. 5, 2024

(65) Prior Publication Data
US 2025/0227087 A1    Jul. 10, 2025

(51) Int. Cl.
*H04L 9/40* (2022.01)

(52) U.S. Cl.
CPC .................. *H04L 63/02* (2013.01)

(58) Field of Classification Search
CPC ... H04L 43/10; H04L 67/145; H04L 43/0811; H04L 67/14; H04L 43/16; H04L 63/02; H04W 76/25; H04W 24/08
See application file for complete search history.

(56) References Cited

U.S. PATENT DOCUMENTS

| | | | |
|---|---|---|---|
| 9,119,173 B1* | 8/2015 | Krishnamoorthy ... | H04W 68/02 |
| 9,137,268 B2* | 9/2015 | Yang ................... | H04L 65/1066 |
| 10,481,666 B2* | 11/2019 | Prathipati ........... | H04L 12/2807 |
| 11,337,150 B2* | 5/2022 | Zhang .............. | H04W 52/0216 |

(Continued)

FOREIGN PATENT DOCUMENTS

| CN | 115499902 A | * 12/2022 | ......... H04W 52/028 |
|---|---|---|---|
| DE | 602004008415 T2 | 12/2007 | |

(Continued)

OTHER PUBLICATIONS

W. Minqi et al., "A two-way Asymmetric Heartbeat Packet Sending Algorithm for Improving the Stability of Narrow-Band-Internet-of-Things TCP Long Connection with Least Resource Consumption," 2021 International Conference on Machine Learning and Intelligent Systems Engineering (MLISE), Chongqing, China (Year: 2021).*

(Continued)

*Primary Examiner* — Khalid M Almaghayreh
(74) *Attorney, Agent, or Firm* — Honigman LLP; Matthew H. Szalach; Jonathan P. O'Brien (57) ABSTRACT

A system includes data processing hardware and memory hardware in communication with the data processing hardware. The memory hardware stores instructions that when executed on the data processing hardware cause the data processing hardware to perform operations. The operations include configuring a ping interval protocol for an electronic control unit (ECU), initializing a ping fail counter of the ping interval protocol, and establishing a message queueing telemetry transport (MQTT) session. The operations also include detecting a ping status of the ping interval protocol, determining, automatically, an optimal ping interval of the ping interval protocol based on the detected ping status and the ping fail counter, constructing a ping interval topic for the MQTT session, and publishing the determined optimal ping interval to the ping interval topic.

17 Claims, 6 Drawing Sheets

(56) References Cited

U.S. PATENT DOCUMENTS

| | | | | |
|---|---|---|---|---|
| 12,095,853 | B1* | 9/2024 | Cowan | H04L 67/101 |
| 12,143,442 | B1* | 11/2024 | Cowan | G06F 16/80 |
| 12,192,274 | B1* | 1/2025 | Cowan | H04L 67/101 |
| 2013/0185421 | A1* | 7/2013 | Yang | H04L 65/1066 |
| | | | | 709/224 |
| 2013/0290495 | A1 | 10/2013 | Cheong | |
| 2016/0320824 | A1* | 11/2016 | Prathipati | H04L 12/2807 |
| 2019/0393451 | A1* | 12/2019 | Ishihara | H01M 10/0525 |
| 2021/0051590 | A1* | 2/2021 | Hakola | H04W 76/27 |
| 2021/0329727 | A1 | 10/2021 | Yu | |

FOREIGN PATENT DOCUMENTS

| | | |
|---|---|---|
| DE | 102015104651 A1 | 10/2015 |
| DE | 102018130216 A1 | 6/2019 |

OTHER PUBLICATIONS

Rahman, M. S. et al., "Using Adaptive Heartbeat Rate on Long-Lived TCP Connections," IEEE/ACM Transactions on Networking, vol. 26, No. 1, Feb. 2018, pp. 203-216.

"Adaptive Heartbeats for Our Information Superhighway," Medium, retrieved from the internet on Dec. 5, 2024, <https://medium.com/gojekengineering/adaptive-heartbeats-for-our-information-superhighway-26459bf85d62>.

* cited by examiner

PING INTERVAL SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a ping interval system and automatic determination of an optimal ping interval.

Networks capable of communication with external devices typically utilize a firewall to protect against malicious connections. The firewall may automatically disconnect any connection after a predetermined period of time during which the firewall fails to receive a heartbeat contact with the external device. The heartbeat contact is utilized as a marker of continued connection between the firewall and the external device. To avoid unintended disconnection, the external device may execute the heartbeat contact at an increased rate, which may ultimately decrease the overall efficiency of the external device. Further, firewalls may change and/or update over time and, thus, the predetermined time for the heartbeat contact may change. Conventional systems require the external device to make contact with a server of the network using some form of heartbeat contact and do not allow the server to initiate contact with an external device.

SUMMARY

In some aspects, a computer-implemented method when executed by data processing hardware causes the data processing hardware to perform operations. The operations include configuring a ping interval protocol for an electronic control unit (ECU), connecting the ECU to a data network including a packet firewall, establishing a message queueing telemetry transport (MQTT) session corresponding to the data network, and detecting a ping status of the ping interval protocol relative to the packet firewall. The operations also include determining, automatically, an optimal ping interval for the ping interval protocol based on the ping status, constructing a ping interval topic for the MQTT session including the determined optimal ping interval, and publishing the determined optimal ping interval to the ping interval topic.

In some examples, detecting the ping status may include detecting a failure. Optionally, determining, automatically, the optimal ping interval may include decrementing a ping interval value and monitoring the ping status for a success. In some configurations, detecting the ping status may include detecting a success and determining, automatically, the optimal ping interval may include incrementing a ping interval value to a failure. The operations may also include decrementing the ping interval value to a penultimate interval value corresponding to the optimal ping interval value. In some instances, configuring the ping interval protocol may include using a default ping interval and monitoring a ping status of the default ping interval. The operations may further include sharing the optimal ping interval with a subscribed electronic control unit (ECU) to the ping interval topic, wherein publishing the ping interval topic includes issuing an optimal ping interval value notification to the subscribed ECU.

In other aspects, a system includes data processing hardware and memory hardware in communication with the data processing hardware. The memory hardware stores instructions that when executed on the data processing hardware cause the data processing hardware to perform operations. The operations include configuring a ping interval protocol for an electronic control unit (ECU), initializing a ping fail counter of the ping interval protocol, and establishing a message queueing telemetry transport (MQTT) session. The operations also include detecting a ping status of the ping interval protocol, determining, automatically, an optimal ping interval of the ping interval protocol based on the detected ping status and the ping fail counter, constructing a ping interval topic for the MQTT session, and publishing the determined optimal ping interval to the ping interval topic.

In some examples, detecting the ping status may include detecting a failure. Optionally, detecting the ping status may include detecting a failure and determining, automatically, the optimal ping interval may include decrementing a ping interval value and monitoring the ping status for a success. In some instances, detecting the ping status may include detecting a success and determining, automatically, the optimal ping interval may include incrementing a ping interval value to a failure. The operations may also include decrementing the ping interval value to a penultimate interval value corresponding to the optimal ping interval value. In other examples, configuring the ping interval protocol may include using a default ping interval and monitoring a ping status of the default ping interval. In some configurations, establishing the MQTT session may include connecting the ECU to a data network configured with a packet firewall configured to receive a ping of the ping interval protocol from the ECU.

In further aspects, a computer-implemented method when executed by data processing hardware causes the data processing hardware to perform operations. The operations include connecting an electronic control unit (ECU) to a data network, configuring a ping interval protocol for the ECU, the ping interval protocol including a default ping interval configured to send a ping to a firewall of the data network, and detecting a ping status associated with a ping interval value of the default ping interval. The operations also include adjusting interval values of the ping interval protocol, monitoring the ping status of the ping interval value, and determining an optimal ping interval based on the adjusted interval values and the monitored ping status of the ping interval value. Further, the operations include communicating the optimal ping interval to a subscribed electronic control unit (ECU) of the data network.

In some examples, connecting to the data network may include establishing a message queueing telemetry transport (MQTT) session and constructing a ping interval topic and communicating the optimal ping interval may include publishing an optimal ping interval value notification on the ping interval topic. Optionally, communicating the optimal ping interval may include verifying, by the subscribed ECU, the optimal ping interval received from the ping interval topic. In some instances, adjusting the interval values may include increasing the ping interval value and monitoring the ping status includes detecting a failure of the ping status. In further instances, determining the optimal ping interval may include decreasing the ping interval value to a penultimate interval value based on the adjusted interval values and the failure of the ping status. In other examples, detecting the ping status may include a failure of the ping status and adjusting the interval values includes decreasing the ping interval value.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1:
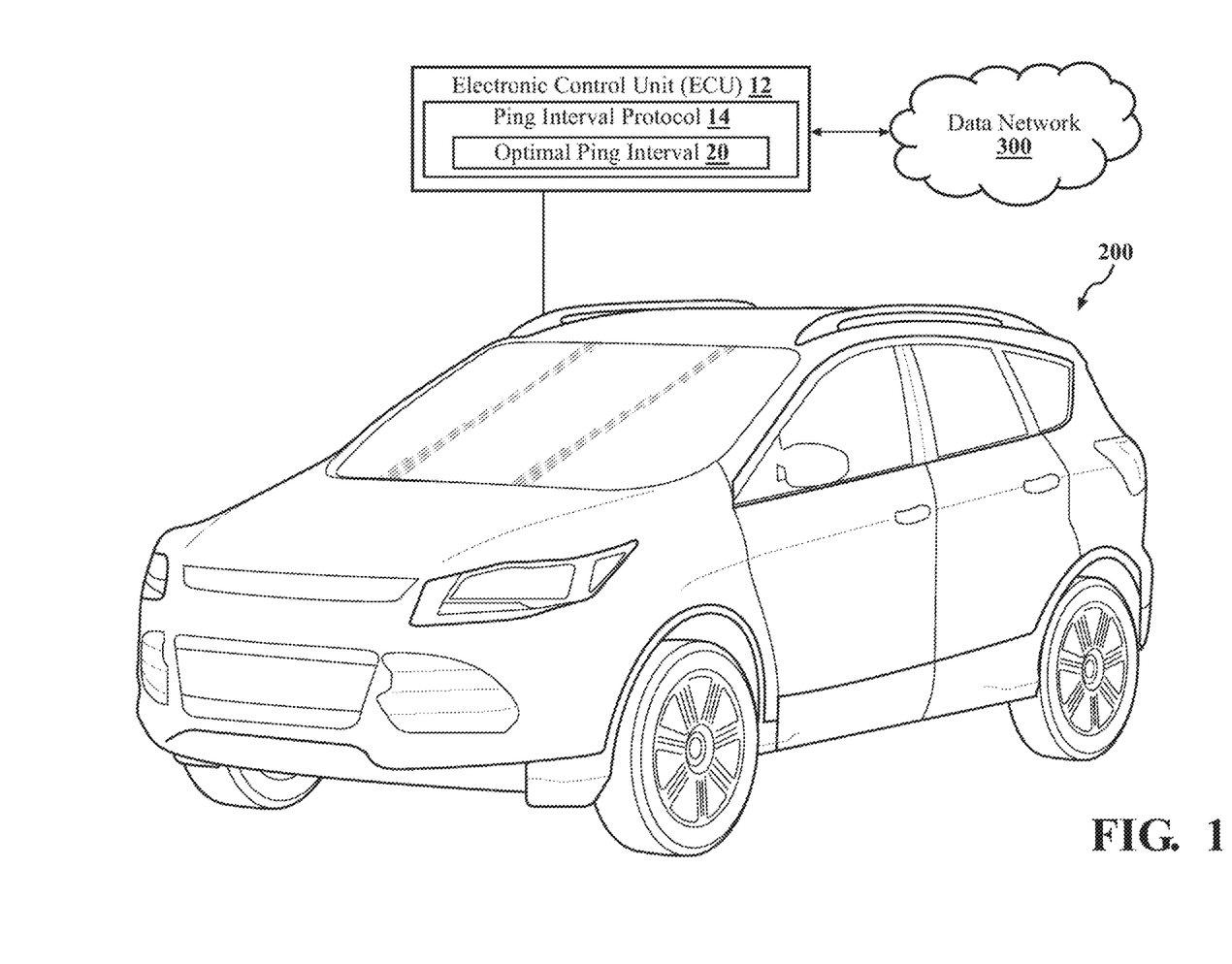
FIG. 1 is a schematic perspective view of a vehicle including an electronic control unit (ECU) configured with a ping interval protocol according to the present disclosure.
Figure 2:
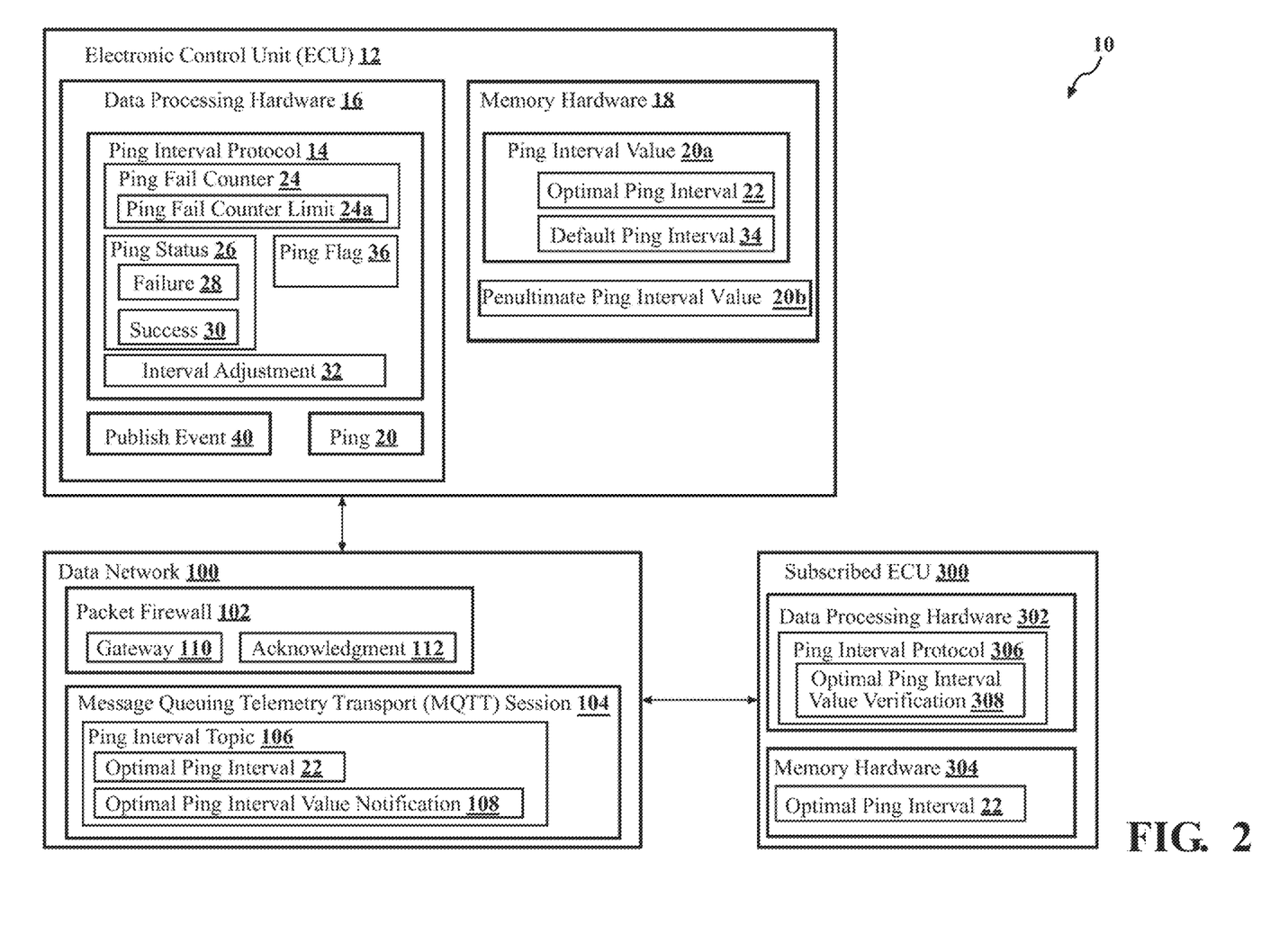
FIG. 2 is a block diagram of a ping interval system according to the present disclosure.
Figure 3:
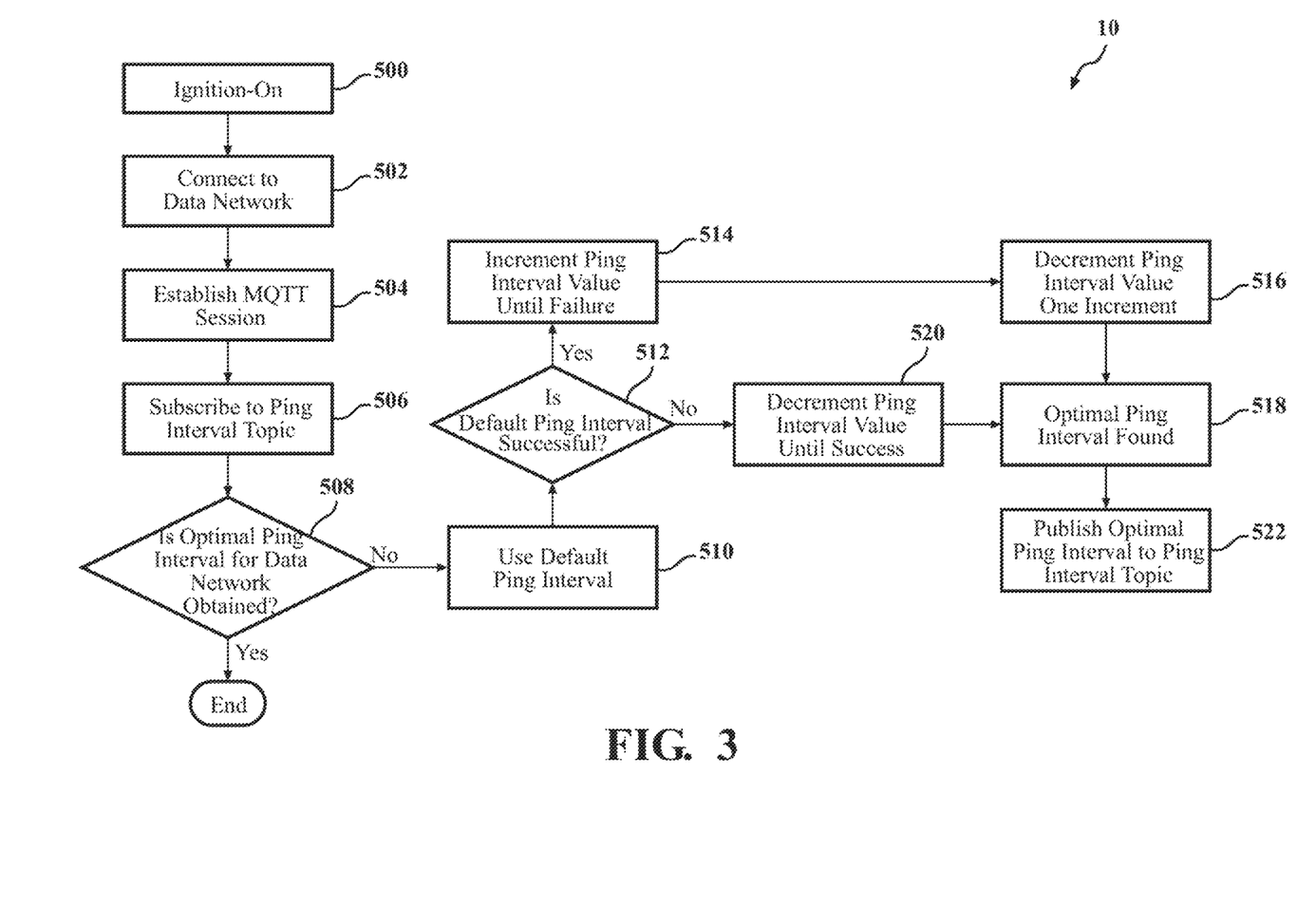
FIG. 3 is an example flow diagram of a ping interval system according to the present disclosure.
Figure 4:
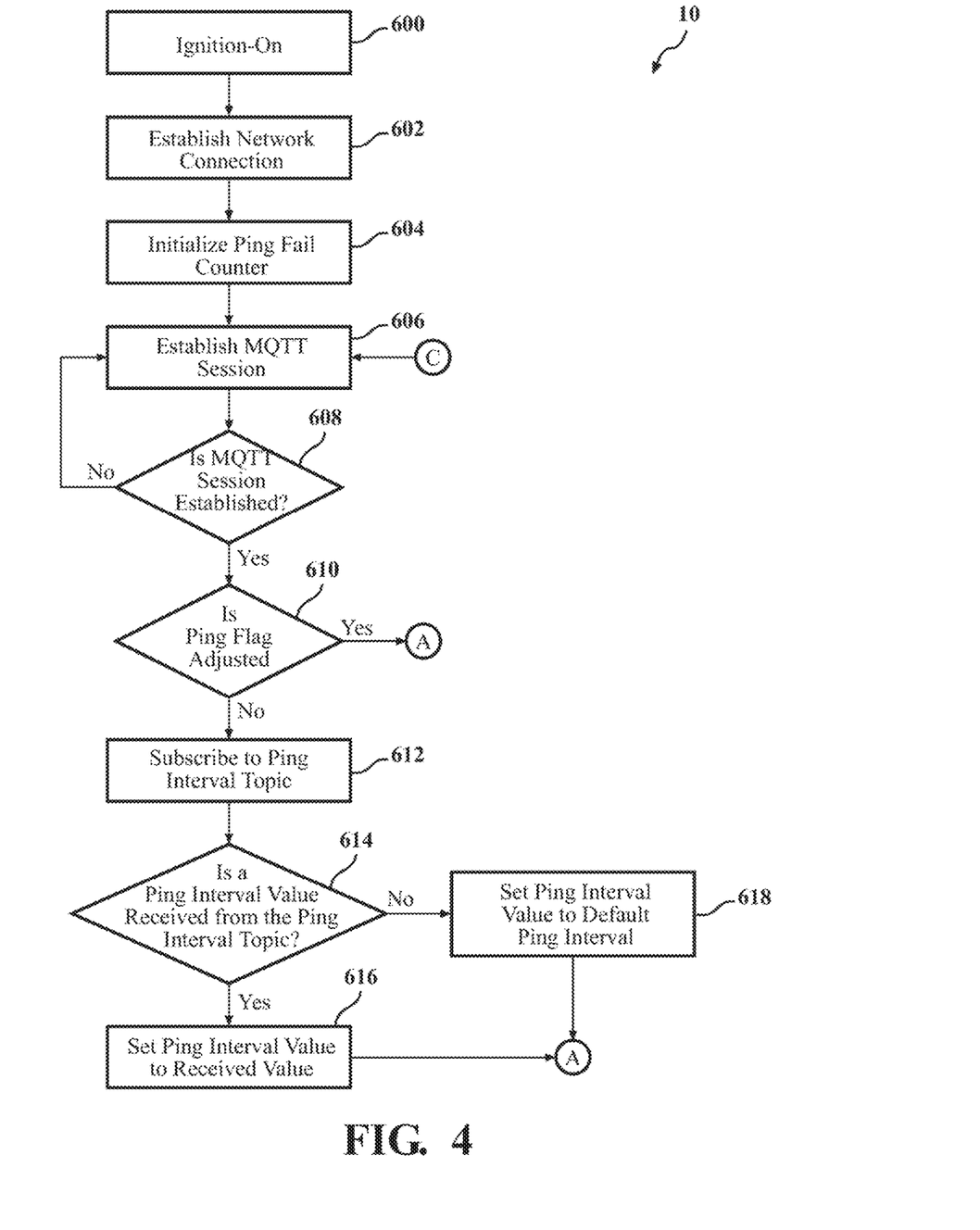
FIG. 4 is another example flow diagram of a ping interval system according to the present disclosure.
Figure 5:
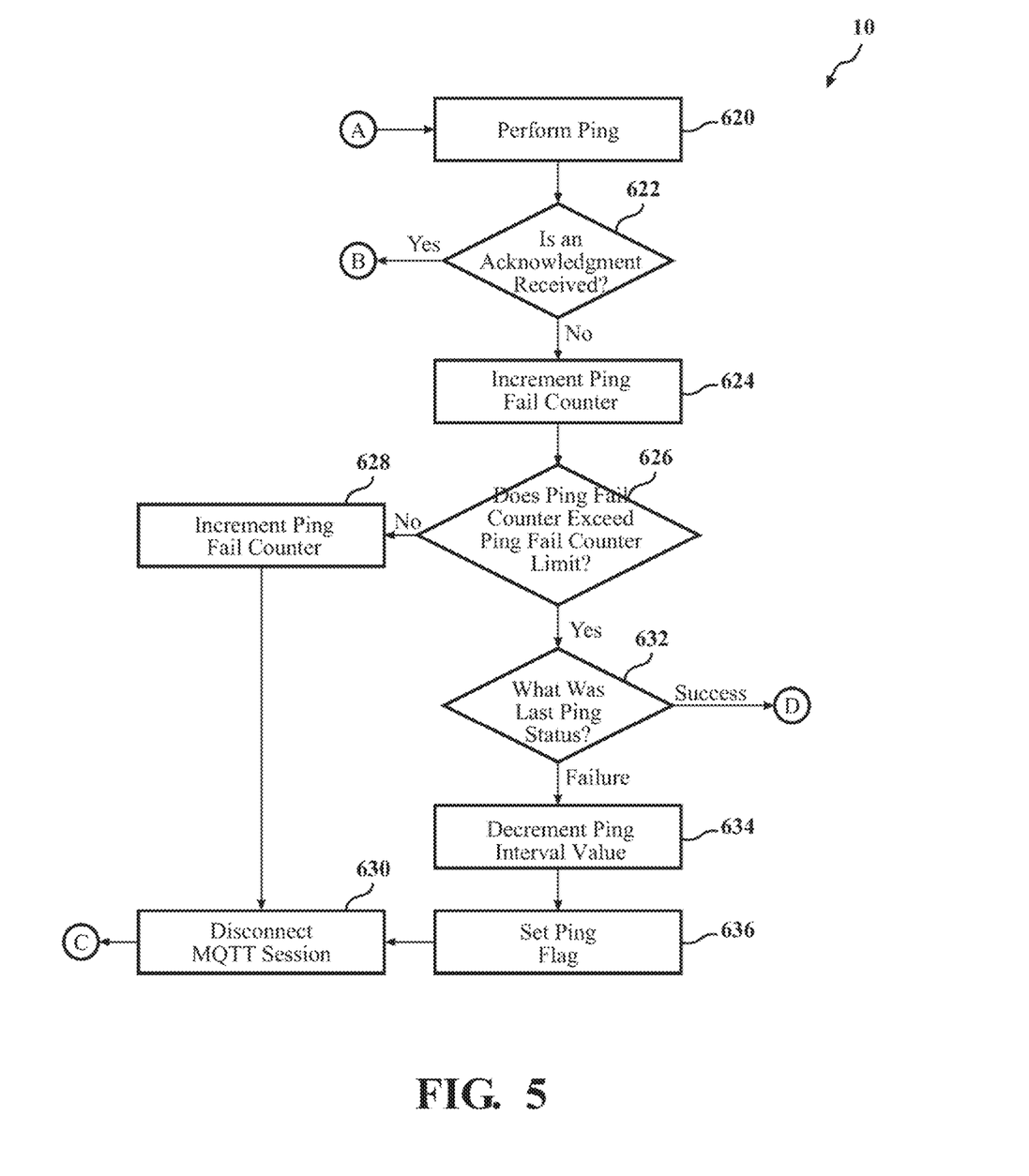
FIG. 5 is an example flow diagram of the ping interval system of FIG. 4.
Figure 6:
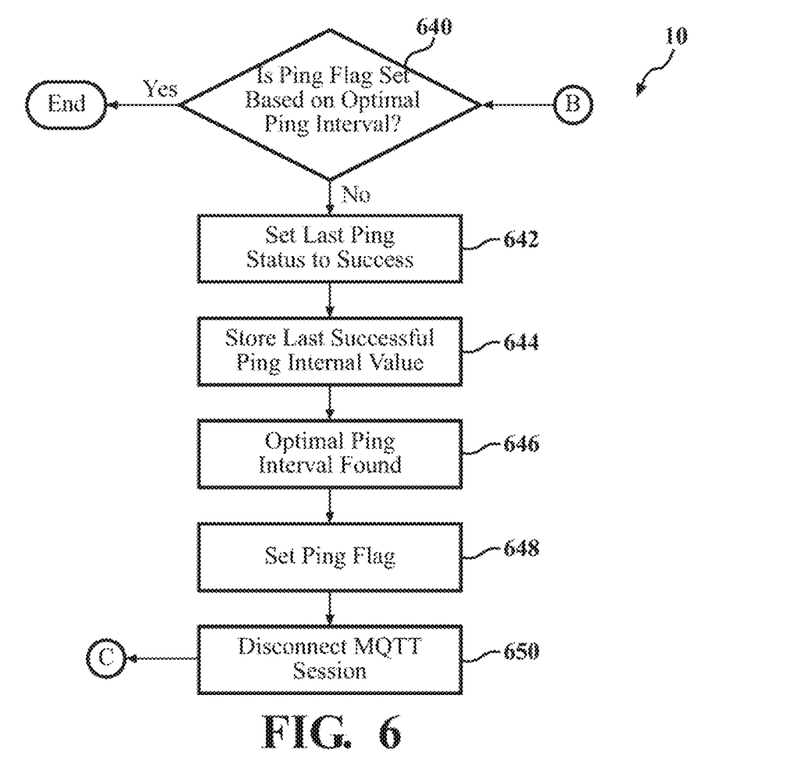
FIG. 6 is an example flow diagram of the ping interval system of FIG. 5.
Figure 7:
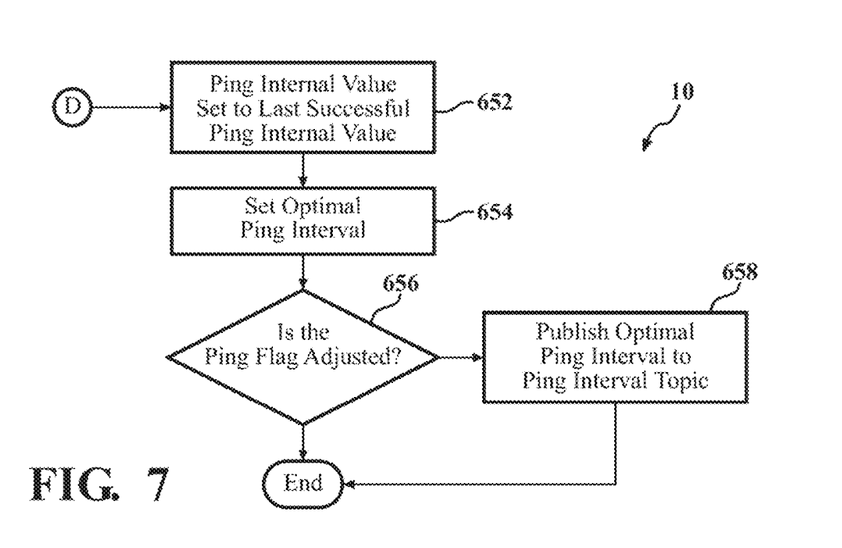
FIG. 7 is an example flow diagram of the ping interval system of FIG. 4.

Referring to FIGS. 1-3, a ping interval system 10 includes at least one electronic control unit (ECU) 12 configured to execute a ping interval protocol 14. The ping interval system 10 further includes a data network 100 that is communicatively coupled to the ECU 12. The data network 100 includes a packet firewall 102 and a message queueing telemetry transport (MQTT) session 104. The data network 100 may include, but is not limited to, an access point name (APN) and/or a data network name (DNN), which may include cellular networks. For example, the data network 100 is configured to handoff internet connection to the ECU 12. As described herein, the ECU 12 is configured as part of a vehicle 200. However, the ECU 12 may be incorporated as part of any practicable device configured for communication with the data network 100. Additionally or alternatively, the ping interval protocol 14 may be utilized and/or configured with software of any practicable device. The ECU 12 includes data processing hardware 16 configured to perform operations and memory hardware 18 in communication with the data processing hardware 16. The memory hardware 18 stores instructions that, when executed by the data processing hardware 16, cause the data processing hardware 16 to perform the operations set forth herein.

In some examples described herein, the ping interval system 10 may also include a subscribed ECU 300. The subscribed ECU 300 may be a third-party ECU that is subscribed to a ping interval topic 106 of the MQTT session 104, described in more detail below, and may thus be communicatively coupled to the data network 100. While described as a singular subscribed ECU 300, it is contemplated that there may be multiple third-party ECUs 300 that are subscribed to the ping interval topic 106. Similar to the ECU 12, the subscribed ECU 300 is configured with data processing hardware 302 and memory hardware 304. The data processing hardware 302 is configured to execute a ping interval protocol 306, which includes executing an optimal ping interval value verification 308, described in more detail below.

With continued reference to FIGS. 1-3, the data processing hardware 16 of the ECU 12 executes the ping interval protocol 14, which sends a ping 20 to the packet firewall 102 of the data network 100 at predetermined intervals. The memory hardware 18 stores a ping interval value 20a, which generally corresponds to a duration of time between each issued ping 20. The ping 20 is configured to establish and maintain a connection between the ECU 12 and the data network 100 by communicating the connection with the packet firewall 102. As described in more detail below, the ping interval protocol 14 may be utilized to determine an optimal ping interval 22.

The optimal ping interval 22 is defined as a ping 20 that is issued at intervals of time that maintain the connection with the data network 100, while minimizing the operational load of the ECU 12. For example, the optimal ping interval 22 may optimize the efficiency of the ECU 12 by issuing a ping 20 at a period of time short enough to maintain the connection with the packet firewall 102 and long enough to conserve battery life of the ECU 12 and/or the vehicle 200. The packet firewall 102 is configured to regularly monitor for the pings 20 and may disconnect an incoming connection based on a delayed ping 20. Thus, the connection between the ECU 12 and the data network 100 is monitored and secured via the packet firewall 102 and the pings 20. The ping interval value 20a determines the rate at which the pings 20 are issued by the ping interval protocol 14. The ECU 12 may receive an acknowledgement 112 from the packet firewall 102 in response to the ping 20, described in more detail below.

The data processing hardware 16 may configure the ping interval protocol 14 with a ping fail counter 24. The ping fail counter 24 is configured to cooperate with a ping status 26 of each respective ping 20 to the data network 100. For example, the ping status 26 includes a failure status or failure 28 and a success status or success 30. As noted above, the pings 20 serve to maintain an active connection with the packet firewall 102 of the data network 100. The pings 20 provide feedback to the packet firewall 102 that a connection has remained active and fresh, which, in turn, may provide the ECU 12 access to a gateway 110.

The packet firewall 102 is configured with a predetermined period of time during which the connection between the ECU 12 and the data network 100 may be maintained without the packet firewall 102 receiving a ping 20. Thus, the configuration of the ping interval protocol 14 is designed to match with the predetermined period of time for the packet firewall 102. As described below, it is contemplated that the predetermined period of time may alter or otherwise change over time. Thus, the ping interval protocol 14 may be continuously updated and configured to adjust to the packet firewall 102 connection and identify the optimal ping interval 22. The data processing hardware 16 may configure the ping interval protocol 14 with an interval adjustment 32, which assists in adjusting or otherwise altering the ping interval value 20a depending on the packet firewall 102, described in more detail below.

In some examples, the initial configuration of the ping interval protocol 14 may utilize a default ping interval 34 to establish the connection between the ECU 12 and the data network 100. The default ping interval 34 may be predetermined within the ECU 12. The ping interval protocol 14 may run the default ping interval 34 and monitor the ping status 26 to determine whether the default ping interval 34 is successful. If the ECU 12 detects a success status 30, then the ECU 12 may maintain the connection with the data network 100 via the default ping interval 34. The ECU 12 may also utilize the interval adjustment 32 to increment the ping interval value 20a. Incrementing, or increasing, the ping interval value 20a may be advantageous to improve the overall efficiency of the ECU 12 by freeing capacity that may otherwise be utilized to execute the pings 20. For example, increasing the duration of time between pings 20 with the packet firewall 102 may provide energy savings and efficiencies for the ECU 12 during operation, while maintaining the connection with the data network 100. The interval adjustment 32 of the ping interval protocol 14 is described in more detail below.

In some examples, the ping fail counter 24 is initialized prior to establishing a connection with the data network 100. The ping fail counter 24 includes a ping fail counter limit 24a, which may be utilized in attempting to establish the connection with the MQTT session 104 of the data network 100. For example, the ECU 12 may detect a failure status 28 of the pings 20, such that the number of failures 28 of the pings 20 may correspond to the ping fail counter limit 24a. In this example, the data processing hardware 16 executes operations to automatically determine the optimal ping interval 22 of the ping interval protocol 14 based on the detected ping status 26. In some instances, the data processing hardware 16 may automatically determine the optimal ping interval 22 based on the ping status 26 and the ping fail counter 24.

Referring still to FIGS. 1-3, the ECU 12 establishes an MQTT session 104 corresponding to the data network 100 as a result of the authorized connection with the data network 100 via the packet firewall 102. The MQTT session 104 provides a lightweight, long link connection between the data network 100 and the ECU 12. It is generally contemplated that the data network 100 may correspond to a carrier server and/or a back-office server. In either example, the packet firewall 102 may include the gateway 110 and the acknowledgement 112. The gateway 110 provides an interface with the internet services. Thus, the established connection between the ECU 12 and the data network 100 provides access to the gateway 110 and the ability to share information across the gateway 110, as described in more detail below.

The acknowledgement 112 is issued from the data network 100 as a method of communication with the ECU 12. For example, once the connection is established, the data processing hardware 16 may set a ping flag 36 corresponding to the established connection between the data network 100 and the ECU 12. The acknowledgement 112 may be utilized to verify the ping flag 36. The acknowledgement 112 may also be utilized in combination with the ping fail counter 24. For example, if the ECU 12 does not receive an acknowledgment 112 from the packet firewall 102, then the ping fail counter 24 may be incremented. The ping interval protocol 14 determines whether the incremented ping fail counter 24 exceeds the ping fail counter limit 24a. In some examples, the ping fail counter 24 may exceed the limit 20a as a result of the lack of acknowledgement 112 and the last ping status 26 corresponding to a failure 28. In this example, the ECU 12 may then decrement the ping interval value 20a, such that the ping 20 is sent to the packet firewall 102 more frequently.

While the ECU 12 is configured to communicate with the data network 100, it is also contemplated that the data network 100 may communicate to the ECU 12. Once the ping fail counter limit 24a is obtained, the data processing hardware 16 may reset to automatically determine the optimal ping interval 22 utilizing the processes described herein. The acknowledgement 112 from the data network 100 of the ping 20 is one example of the data network 100 communicating with the ECU 12. Other examples of communication from the data network 100 to the ECU 12 and/or the subscribed ECU 300 are described in more detail below.

The data processing hardware 16 is configured to, ultimately, determine the optimal ping interval 22 based on the ping status 26 relative to the packet firewall 102. The optimal ping interval 22 may be determined automatically through execution of the interval adjustment 32. For example, the data processing hardware 16 may automatically monitor the ping status 26 and increment or decrement the ping interval value 20a. Ultimately, the optimal ping interval 22 is defined by the longest duration of time between pings 20 while maintaining the connection with the packet firewall 102. While the data processing hardware 16 may determine the optimal ping interval 22 for a given time frame, it is contemplated that the packet firewall 102 may be regularly updated such that the ping status 26 may change as a result. Thus, the ping interval protocol 14 is configured to continuously monitor the ping status 26 for failure 28. If there are multiple failures 28, then the ping interval value 20a is reduced or decremented because the packet firewall 102 is not maintaining the connection. For example, the packet firewall 102 is not receiving the ping 20 frequent enough when a failure 28 is detected repeatedly, so the packet firewall 102 disconnects from the ECU 12.

In automatically determining the optimal ping interval 22, the ping interval value 20a is incremented or decremented, depending on the initial ping status 26. For example, if the ping status 26 is a failure 28, then the ping interval value 20a is decremented or decreased until the ping status 26 is a success 30. In other examples, if the initial ping status 26 is a success 30, the ping interval value 20a may be incremented or increased until the ping status 26 is a failure 28. Once the ping interval value 20a has been incremented to failure 28, then the ping interval value 20a is decreased to a penultimate interval value 20b based on the adjusted interval values 20a and the failure 28 of the ping status 26.

The penultimate interval value 20b may correspond with the optimal ping interval 22. For example, the penultimate interval value 20b is the last successful ping 20 prior to the detected failure 28. Thus, the penultimate interval value 20b is the longest duration of time between pings 20 that maintains the connection with the packet firewall 102. The process of determining the optimal ping interval 22 is automatically executed by the data processing hardware 16 as part of the ping interval protocol 14 to continuously improve the connection efficiency between the ECU 12 and the data network 100. Once success 30 is repeatedly detected, the data processing hardware 16 may set the ping flag 36 associated with the optimal ping interval 22.

With further reference to FIGS. 1-3, the ECU 12 may share the optimal ping interval 22 with the data network 100. For example, the ECU 12 may construct the ping interval topic 106 for the MQTT session 104 that includes the optimal ping interval 22. The ping interval topic 106 may also include an optimal ping interval value notification 108, which may be shared with any potential subscribed ECUs 300. The data processing hardware 16 may execute a publish event 40. The publish event 40 provides the optimal ping interval 22 to the ping interval topic 106 and, thus, to any subscribed ECU 300 to the ping interval topic 106 of the MQTT session 104. The data network 100 may communicate the published optimal ping interval 22 to ECUs 300 that subscribe to the ping interval topic 106.

The subscribed ECU 300 may also be connected to the MQTT session 104 in a similar manner described herein with respect to the ECU 12. However, the subscribed ECU 300 may receive the optimal ping interval value notification 108 from the ping interval topic 106, which may minimize the duration of time that the data processing hardware 302 of the subscribed ECU 300 spends determining the optimal ping interval 22. Once the subscribed ECU 300 receives the optimal ping interval value notification 108, the subscribed ECU 300 executes the optimal ping interval value verification 308. Thus, the subscribed ECU 300 receives the optimal ping interval 22 as a result of the subscription to the ping interval topic 106, but verifies the optimal ping interval 22 via the optimal ping interval value verification 308.

For example, the subscribed ECU 300 connects to the data network 100 and subscribes to the ping interval topic 106 as part of the established MQTT session 104. The subscribed ECU 300 requests any messages associated with the ping interval topic 106. If the subscribed ECU 300 receives the optimal ping interval value notification 108, then the subscribed ECU 300 will verify the optimal ping interval 22. The optimal ping interval value verification 308 is a similar process to the determination of the optimal ping interval 22, described above. If the optimal ping interval value notification 108 is not available, then the subscribed ECU 300 will execute the process described above with respect to automatically determining the optimal ping interval 22. For example, the subscribed ECU 300 starts with the default ping interval 34 and proceeds with incrementing and/or decrementing until the optimal ping interval 22 is determined.

With reference still to FIGS. 1-3, an example flow diagram of the ping interval system 10 is illustrated in FIG. 3. At an initial step 500, an ignition of the vehicle 200 is activated to an "on"-state, and the ECU 12 connects, at 502, to the data network 100. The ECU 12 may subsequently, at 504, establish the MQTT session 104 and, at 506, subscribe to the ping interval topic 106. The ECU 12 determines, at 508, whether the optimal ping interval 22 for the data network 100 obtained. If the optimal ping interval 22 is obtained, then the process of determining the optimal ping interval 22 may end. If no optimal ping interval 22 is obtained, then the ECU 12, at 510, uses the default ping interval 34. The ECU 12 then determines, at 512, whether the default ping interval 34 is successful. If the default ping interval 34 results in a success 30, then the ECU 12, at 514, increments the ping interval value 20a until a failure 28. In response to the failure 28, the ECU 12, at 516, decrements the ping interval value 20a by one increment. The ECU 12 then determines, at 518, the optimal ping interval 22 is found. If the default ping interval 34 is a failure 28, then the ECU 12 decrements, at 520, the ping interval value 20a until a success 30 and then proceeds with step 518. The ECU 12, at 522, may then publish the optimal ping interval 22 to the ping interval topic 106.

Referring now to FIGS. 4-7, another example flow diagram of the ping interval system 10 is illustrated. At an initial step 600, an ignition of the vehicle 200 is activated to an "on"-state, and the ECU 12 connects, at 602, to the data network 100. The ECU 12 may then, at 604, initialize the ping fail counter 24 and subsequently, at 606, establish the MQTT session 104. The ECU 12 determines, at 608, whether the MQTT session 104 is established. If the MQTT session 104 is not established, the ECU 12 continues to attempt to establish the MQTT session 104. If the MQTT session 104 is established, then the ECU 12 determines, at 610, whether the ping flag 36 has been adjusted. If the ping flag 36 has not been adjusted, then the ECU 12, at 612, subscribes to the ping interval topic 106. The ECU 12 may then determine, at 614, whether there is a ping interval value 20a received from the ping interval topic 106. If a ping interval value 20a is received, then the ECU 12, at 616, sets the ping interval value 20a to the received value. If no ping interval value 20a is received, then the ECU 12, at 618, sets the ping interval value 20a to the default ping interval 34.

The ECU 12 then, at 620, performs a ping 20 and determines, at 622, whether an acknowledgement 112 is received. If no acknowledgement 112 is received, then the ECU 12, at 624, increments the ping fail counter 24. The ECU 12 determines, at 626, whether the ping fail counter 24 exceeds the ping fail counter limit 24a. If the ping fail counter 24 does not exceed the ping fail counter limit 24a, then the ECU 12, at 628, increments the ping fail counter 24 and, at 630, disconnects the MQTT session 104.

If the ping fail counter 24 does exceed the ping fail counter limit 24a, then the ECU 12 determines, at 632, the last ping status 26. If the ping status 26 is a failure 28, then the ECU 12, at 634, decrements the ping interval value 20a and, at 636, sets the ping flag 36. Once the ping flag 36 is set, then the ECU 12 can disconnect the MQTT session 104. Returning to step 622, if an acknowledgement 112 is received, then the ECU 12 determines, at 640, whether to set the ping flag 36 based on an optimal ping interval 22. If not, then the ECU 12, at 642, sets the last ping status 26 to success 30. The ECU 12 may then, at 644, store the last successful ping interval value 20a and, at 646, identify that the optimal ping interval 22 was found. In response, the ECU 12 sets, at 648, the ping flag 36 corresponding to the optimal ping interval 22. The ECU 12 may then, at 650, disconnect from the MQTT session 104 and proceed with re-establishing the MQTT session 104, at 606 (FIG. 4), to proceed with the subsequent steps and processes.

If the last ping status 26 was a success 30, then the ECU 12, at 652, may set the ping interval value 20a to the last successful ping interval value 20a. The ECU 12 then, at 654, sets the optimal ping interval 22. The ECU 12 determines, at 656, whether the ping flag 36 has been adjusted. If the ping flag 36 has not been adjusted, then the process ends. If the ping flag 36 has been adjusted, then the ECU 12, at 658, publishes the optimal ping interval 22 to the ping interval topic 106.

Referring again to FIGS. 1-7, the ping interval system 10 is utilized to maximize the overall energy efficiency of the vehicle 200, while minimizing the data usage and potential charges as a result of repeated pings 20 with the data network 100. The ping interval protocol 14 is configured to automatically adjust the ping interval value 20a by incrementing and/or decrementing the ping interval value 20a until the optimal ping interval 22 is determined. The ECU 12 may publish the optimal ping interval 22 to the ping interval topic 106 of the MQTT session 104 of the data network 100 for use by other, third-party ECUs 300. The third-party ECUs 300 may receive the optimal ping interval 22 by subscribing to the ping interval topic 106. While the subscribed ECUs 300 may receive and utilize the optimal ping interval 22, the subscribed ECUs 300 are configured to execute the optimal ping interval value verification 308 to verify that the optimal ping interval 22 received is still optimal for the packet firewall 102. As noted herein, the optimal ping interval 22 may change over time based on updates and changes to the packet firewall 102.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:
    configuring a ping interval protocol for an electronic control unit (ECU);
    connecting the ECU to a data network including a packet firewall;
    establishing a message queueing telemetry transport (MQTT) session corresponding to the data network;
    detecting a ping status of the ping interval protocol relative to the packet firewall;
    determining, automatically, an optimal ping interval for the ping interval protocol based on the ping status;
    constructing a ping interval topic for the MQTT session including the determined optimal ping interval;
    publishing the determined optimal ping interval to the ping interval topic; and
    sharing the optimal ping interval with a subscribed electronic control unit (ECU) to the ping interval topic, wherein publishing the ping interval topic includes issuing an optimal ping interval value notification to the subscribed ECU.

2. The method of claim 1, wherein detecting the ping status includes detecting a failure.

3. The method of claim 2, wherein determining, automatically, the optimal ping interval includes decrementing a ping interval value and monitoring the ping status for a success.

4. The method of claim 1, wherein detecting the ping status includes detecting a success and determining, automatically, the optimal ping interval includes incrementing a ping interval value to a failure.

5. The method of claim 4, further including decrementing the ping interval value to a penultimate interval value corresponding to the optimal ping interval value.

6. The method of claim 1, wherein configuring the ping interval protocol includes using a default ping interval and monitoring a ping status of the default ping interval.

7. A system comprising:
    data processing hardware; and
    memory hardware in communication with the data processing hardware, the memory hardware storing instructions that when executed on the data processing hardware cause the data processing hardware to perform operations comprising:
    configuring a ping interval protocol for an electronic control unit (ECU);
    initializing a ping fail counter of the ping interval protocol;
    establishing a message queueing telemetry transport (MQTT) session, wherein establishing the MQTT session includes connecting the ECU to a data network configured with a packet firewall configured to receive a ping of the ping interval protocol from the ECU;
    detecting a ping status of the ping interval protocol;
    determining, automatically, an optimal ping interval of the ping interval protocol based on the detected ping status and the ping fail counter;
    constructing a ping interval topic for the MQTT session;

publishing the determined optimal ping interval to the ping interval topic; and sharing the optimal ping interval with a subscribed electronic control unit (ECU) to the ping interval topic, wherein publishing the ping interval topic includes issuing an optimal ping interval value notification to the subscribed ECU.

8. The system of claim 7, wherein detecting the ping status includes detecting a failure.

9. The system of claim 7, wherein detecting the ping status includes detecting a failure and determining, automatically, the optimal ping interval includes decrementing a ping interval value and monitoring the ping status for a success.

10. The system of claim 7, wherein detecting the ping status includes detecting a success and determining, automatically, the optimal ping interval includes incrementing a ping interval value to a failure.

11. The system of claim 10, further including decrementing the ping interval value to a penultimate interval value corresponding to the optimal ping interval value.

12. The system of claim 7, wherein configuring the ping interval protocol includes using a default ping interval and monitoring a ping status of the default ping interval.

13. A computer-implemented method when executed by data processing hardware causes the data processing hardware to perform operations comprising:

connecting an electronic control unit (ECU) to a data network, wherein connecting to the data network includes establishing a message queueing telemetry transport (MQTT) session;

configuring a ping interval protocol for the ECU, the ping interval protocol including a default ping interval configured to send a ping to a firewall of the data network;

detecting a ping status associated with a ping interval value of the default ping interval;

adjusting interval values of the ping interval protocol;

monitoring the ping status of the ping interval value;

determining an optimal ping interval based on the adjusted interval values and the monitored ping status of the ping interval value;

constructing a ping interval topic for the MQTT session;

communicating the optimal ping interval to a subscribed electronic control unit (ECU) of the data network, wherein communicating the optimal ping interval includes publishing an optimal ping interval value notification on the ping interval topic.

14. The method of claim 13, wherein communicating the optimal ping interval includes verifying, by the subscribed ECU, the optimal ping interval received from the ping interval topic.

15. The method of claim 13, wherein adjusting the interval values includes increasing the ping interval value and monitoring the ping status includes detecting a failure of the ping status.

16. The method of claim 15, wherein determining the optimal ping interval includes decreasing the ping interval value to a penultimate interval value based on the adjusted interval values and the failure of the ping status.

17. The method of claim 13, wherein detecting the ping status includes a failure of the ping status and adjusting the interval values includes decreasing the ping interval value.

* * * * *